June 7, 1960
A. R. HERMAN
2,939,218
INSTRUMENT FOR PRECISE AND RAPID DETERMINATION
OF TRIANGULAR MEASUREMENTS
Filed June 2, 1955
3 Sheets-Sheet 1
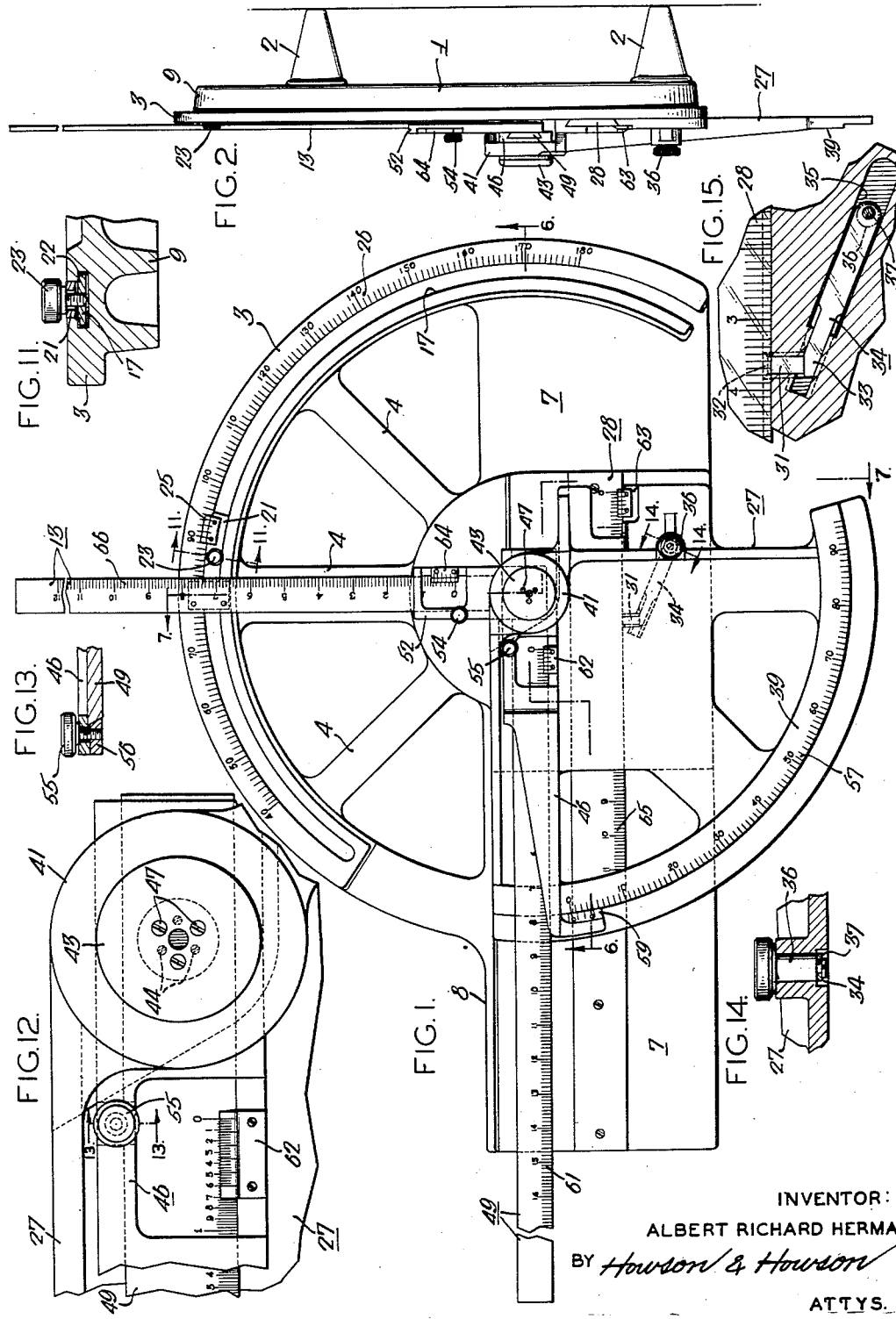
INVENTOR:
ALBERT RICHARD HERMAN
BY Howson & Howson
ATTYS.

June 7, 1960 A. R. HERMAN 2,939,218
INSTRUMENT FOR PRECISE AND RAPID DETERMINATION
OF TRIANGULAR MEASUREMENTS
Filed June 2, 1955 3 Sheets-Sheet 2

INVENTOR:
ALBERT RICHARD HERMAN
BY Howson &
Howson
ATTYS.

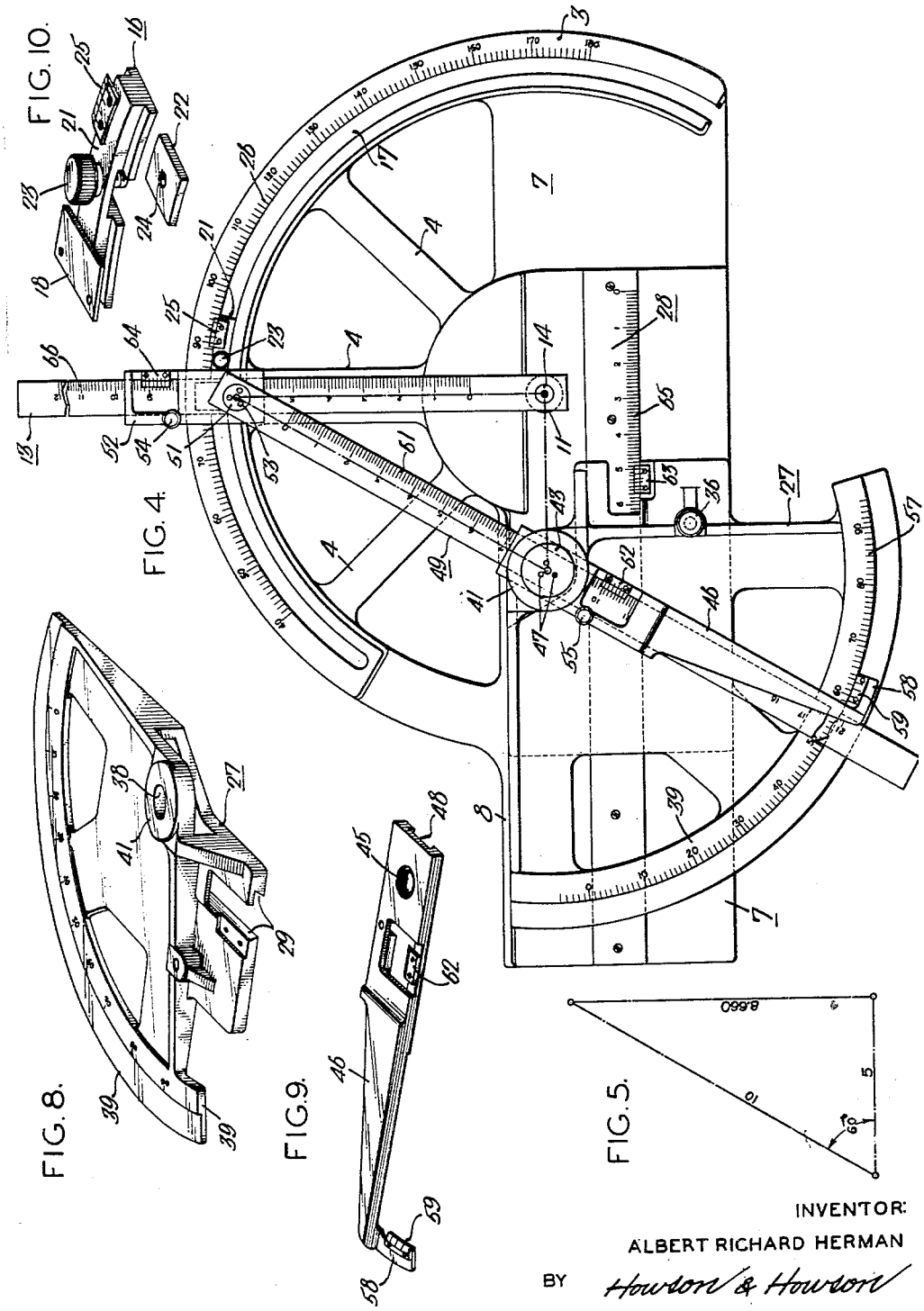

United States Patent Office 2,939,218
Patented June 7, 1960

2,939,218

INSTRUMENT FOR PRECISE AND RAPID DETERMINATION OF TRIANGULAR MEASUREMENTS

Albert Richard Herman, R.D. 1, Elverson, Pa.

Filed June 2, 1955, Ser. No. 512,683

3 Claims. (Cl. 33—98)

A principal object of this invention is to provide an improved instrument for precise and rapid determination of unknown coordinates of triangles without recourse to mathematical process or deduction.

The improvement resides in part in the novel assembly of parts which provides for the determination by direct reading of the sides and angles of any triangle from zero area to the maximum afforded by the capacity of the instrument.

To this end the invention contemplates the provision of an instrument comprising linear elements representing respectively the three sides of a triangle and relatively adjustable to afford minute variations in the length of the said sides and in the magnitudes of each of the included angles from zero to 180°.

To this same end the invention contemplates the provision of an assembly of elements as described above wherein the points representative of the apices of the respective contained angles of the triangle may be brought into coincidence on a line normal to the plane of the triangle as represented by the relatively fixed bed of the instrument.

Still another object of the invention is to provide means for precise checking of the setting of the machine as to the relatively movable parts thereof and for resetting of the parts to their normal relative positions in the event to correct any inaccuracy.

The invention resides further in certain structural and mechanical details and sub-assemblies hereinafter described and illustrated in the attached drawings wherein:

Fig. 1 is a top plan view of an instrument made in accordance with the invention;

Fig. 2 is a side elevational view of the machine as viewed from the right-hand end of Fig. 1;

Fig. 4 is a top plan view of the instrument showing the relatively movable parts thereof in positions corresponding to the triangle appearing in Fig. 5;

Fig. 5 is a diagram showing the triangle to which the elements of the instrument are shown set in Fig. 4;

Fig. 8 is a view in perspective of one of the relatively adjustable elements of the instrument detached from the latter;

Fig. 9 is a view in perspective of another of the relatively movable elements of the instrument;

Fig. 10 is a view in perspective of still another part of the machine of the instrument detached from the latter;

Fig. 11 is a sectional view on the line 11—11, Fig. 1;

Fig. 12 is a fragmentary top plan enlargement of the central portion of the instrument shown in Fig. 1;

Fig. 13 is a sectional view on the line 13—13, Fig. 12;

Fig. 14 is a sectional view on the line 14—14, Fig. 1, and

Fig. 15 is a fragmentary sectional view showing details of the locking device of which the pin illustrated in Fig. 14 constitutes an element.

Figure 3:
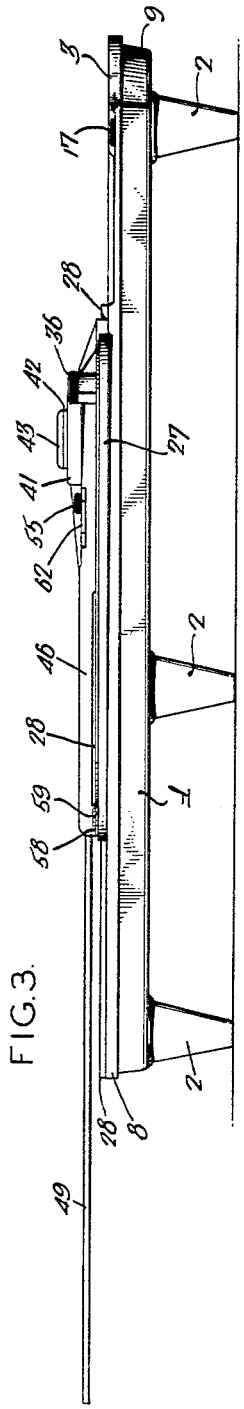
Fig. 3 is a front elevational view of the instrument as it appears in Fig. 1.
Figure 6:
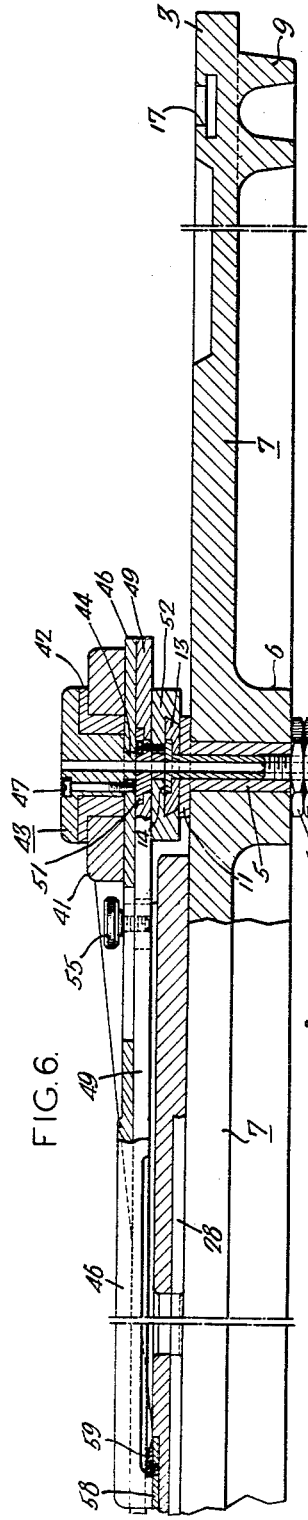
Fig. 6 is an enlarged sectional view on the line 6—6, Fig. 1.
Figure 7:
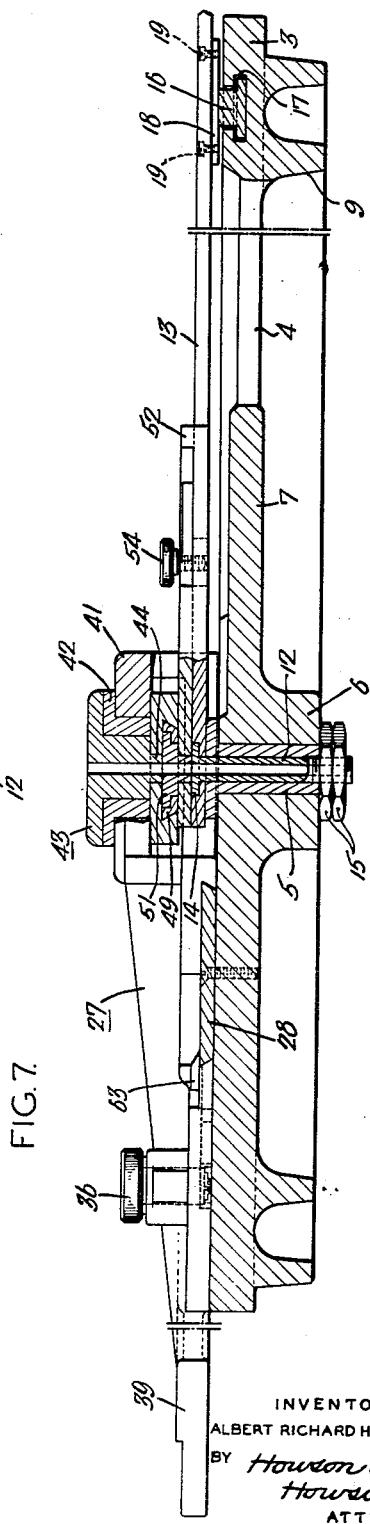
Fig. 7 is an enlarged sectional view on the line 7—7, Fig. 1.

In the illustrated embodiment the instrument of my invention comprises a rigid base member 1 having a flat upper surface defining a datum plane corresponding to the plane of the upper surface of the base member. The base member normally assumes a horizontal position supported on a number of suitably placed feet 2. This base body member 1 comprises an integral segmental rim portion 3 supported in part by arms 4 which extend radially with respect to a central axis normal to the plane of the base and centered in a bushing 5, see Fig. 7, which is mounted in a central depending boss 6 of the base member. This axis established by the bushing 5 is the primary functional axis of the instrument as hereinafter described. The base member 1 comprises also a generally rectangular body portion 7 in which the opposite ends of the segmental portion 3 terminate and which extends at one end beyond the arc of this segmental portion to form an extension 8. As best shown in Figs. 6 and 7, the base member 1 comprises a depending peripheral recessed flange 9 which contributes to the essential rigidity of this member.

Pivotally attached to the flanged upper end 11 of the bushing 5 by means in the present instance of a hollow bolt 12 is a blade 13, the head 14 of the bolt 12 is countersunk in the upper surface of the blade and the lower threaded end of the bolt is secured at the underside of the bushing 5 and the boss 6 of the base 1 by nuts 15. Secured to the underside of the blade 13 at a point remote to the pivotal axis described above, is a segmental guide 16 which is slidably fitted to an undercut recess 17 in the segmental portion 3 of the base 1. The form of the guide 16 is best shown in Fig. 10. It comprises a plate 18 which is attached by screws 19, 19 to the underside of the blade. The body member 21 of the guide in the form generally of an inverted T extends laterally from the underside of the plate 18 and slidably interlocks with the undercut recess 17 of the base. The central portion of the body 21 is recessed at the underside for reception of a clamping block 22 and a screw 23 extends downwardly through an aperture in the body member 21 for threaded engagement with a tapped hole 24 in the block 22. When the block is drawn upwardly by rotation of the screw 23 it is brought into clamping engagement with the shoulders of the slots 17 so that the guide 21 as a whole is clamped solidly to the base. It will be noted that the segmental portion 3 is marked with a scale adjacent the outer edge of the recess 17; and that the guide 21 carries a venier scale 25 which cooperates with the primary scale 26 of the segmental portion 3 in known manner to afford fine settings of the blade 13 with respect to said primary scale. It will be apparent that the blade 13 is adjustable about the primary axis of the instrument established as described above by the bushing 5 and that it may be anchored in any adjusted position with respect to the primary scale 26.

The instrument comprises also a segmental member 27, see Fig. 8, which is mounted for sliding movement on the body portion 7 of the base member 1. The body member 7 has attached thereto and extending longitudinally thereof a blade 28 the side edges of which are bevelled inwardly as thus shown in Fig. 7. The underside of the segmental member 27 has a dovetail slot 29 which receives the blade 28 so that the blade constitutes a guide for the sliding movement of the segment 27 on the base member. As shown in Figs. 1, 14 and 15, means is provided for anchoring the segment 27 rigidly in adjusted position with respect to the guide 28, this consisting of an anchor block 31 mounted slidably in a recess in the edge of the dovetail guide 29 of the segment 27 and having a forward edge 32 which when the block 31 is projected engages the bevelled edge of the blade 28. The block 31 may be forced into clamping engagement with the blade 28 by means of a cam 33 at one end of a bar 34 slidably mounted in a slot 35 in the body of the segmental member 27 and movable in the slot 35 by means of a pin 36, see Figs. 1 and 14. The pin 36 is rotatably mounted in the segmental member and carries at its lower end an eccentrically disposed extension 37 which is rotatively secured in the end of the bar 34 and which when the pin 36 is turned may advance the said bar to effect clamping engagement between the block 31 and member 28. By advancing the bar 34 so that its bevelled terminal edge engages the inner end of the block 31, the latter may be forced into clamping engagement with the blade, and subsequent rotation of the pin 36 will clamp the parts in the adjusted positions. It will be noted that the relative positions of the blades 13 and 28 are such that when the blade 13 is in the position of adjustment shown in Fig. 4, i.e. that corresponding to a 90° position with respect to the scale 26, the blades 13 and 28 will occupy positions at right angles to each other.

As illustrated in Fig. 8 the segmental member 27 has a bore 38 which is coaxial with the segmental arc of the peripheral portion 39 of the member. The bore 38 is formed in a boss 41. The boss carries a bushing 42 in which is journalled a hollow pintle member 43. At its lower end the member 43 has a central depending boss 44 which is accurately fitted to an aperture 45 in one end of a member 46 the form of which is best shown in Fig. 9. As shown in Fig. 6, the member 46 is secured to the underside of the member 43 by a screw 47. As shown in Fig. 9 the member 46 has at one end a longitudinal dovetail slot 48 which receives the correspondingly formed edges of a blade 49. Thus the member 46 may move angularly about the axis of the pintle member 43; or, as also can the blade 49; and the blade 49 can also slide longitudinally of the member 46 in the slot 48.

One end of the blade 49 is pivotally secured by a pintle member 51 to a member 52 this member being slidably mounted on the blade 13. As shown in Fig. 7 the blade 49 is apertured for reception of the flanged pintle member 51 and the lower end of this pintle member is fitted to an aperture in the member 52. As shown in Fig. 6 the pintle member 51 is secured by means of a screw to the member 52. Also as shown in Fig. 6 the member 52 has a longitudinal dovetail slot for reception of the correspondingly formed blade 13. A clamping screw 54, similar to those described above, provides means for immobilizing a member 52 in adjusted position longitudinally of the blade 13.

Means is also provided in the form of a clamping screw 55 and clamping shoe 56 into which the screw 55 is threaded for clamping the member 46 to the blade 49 by drawing up the shoe 56 against the bevelled edge of the blade as illustrated in Fig. 13. The clamping means 54 previously referred to may correspond to this clamping device 55—56.

As previously set forth the segmental peripheral edge of the member 27 is provided with a scale 57 which cooperates with the blade 49 in a manner hereinafter described. As shown in Fig. 8 the outer edge portion of the member 27 is rabbeted and the groove thus formed receives a small downwardly offset blade 58 on the outer end of the member 46. This blade 58 carries a micrometer scale 59 as illustrated in Fig. 4 which coacts with the primary scale 57 of the approximate segment in well known manner. It will be noted also that micrometer means is provided on the member 46 for cooperation with a scale 61 on the blade 49. This micrometer consists of a blade 62 on the member 46 which overrides the scale 61 of the blade 49 as illustrated in Fig. 4. Similar micrometer devices indicated generally by the reference numerals 63 and 64 are provided on the member 27 for cooperation with a scale 64 on the blade 28, and on the slide member 52 for cooperation with a scale 66 on the blade 13.

The scale 26 on portion 3 of the base member, and the associated offset micrometer 25 are so arranged that the scale will register precisely the angularity of the blade 13 with the spectral line parallelling the blade 28. The scale 66 of the blade 13 and the associated micrometer 64 are so relatively arranged that they indicate precisely the distance in any position of adjustment of the blade 49 with respect to the blade 13 the distance between the primary pivot of the instrument as represented by the axis of the bushing 5 as previously set forth and the axis of the pivotal connection between the blade 49 and the blade 13. The scale 61 of the blade 49 and the associated micrometer 62 are so relatively arranged as to indicate precisely in all relative adjustments of the instrument the distance between the point of pivotal connection between the connection of the blade 49 and the blade 13 and the pivotal axis of the pivotal member 43 in the segmental member 27. Finally the scale 65 and its associated micrometer 63 on the segmental member 27 are so relatively arranged as to indicate precisely the exact distance in any position of adjustment between the primary axis of the instrument and the pivot of the pintle member 43 on the member 27 as described above. It is apparent therefore that in any positions of adjustment of the segmental member 27 on the base member 1 and longitudinally of the blade 28, and of the blade 13 about the primary axis of the instrument, the latter will give a precise direct reading of the length of all sides of the triangle defined by the three aforesaid pivots and also the precise angle in degrees between each of the pairs of sides represented by the blades 49 and 28 on the one hand and the blades 49 and 13 on the other. Thus in the setting of the instrument illustrated in Fig. 4 the triangle indicated as illustrated in Fig. 5 shows a right angle triangle of which the acute angles are 60° and 30° respectively and two sides of which are five inches and 8.660 inches respectively and the hypotenuse is ten inches. It is to be noted particularly that the construction described above provides for bringing the three points of the triangle as represented respectively by the aforesaid primary axis of the instrument, the pivotal axis of the pintle 43 and the pivotal axis of connections between the blades 49 and 13 into exact coincidence with respect to a line normal to the plane of the triangle as represented by the plane of the base member 3 of the instrument. This position of coincidence is illustrated in Fig. 1 and it will be noted that in this position the readings of all scales is zero. The instrument will determine the measurement of any triangle up to the capacity of the several scales.

Advantage of this ability to bring the primary points into coincidence is to check the accuracy of the setting of the machine. This is accomplished by providing several coinciding pivotal parts including the bolt 12 and the pintle elements 52 and 43 with accurately positioned central bores of identical diameters so that when the parts are brought into coincidence as described above, a pin of accurate dimensions to fit the bore may be inserted so as to insure precise alignment of the bores and coincidence of the axes. Under these conditions the scales should register zero as indicated, and if these readings do not appear the necessary adjustments can be made to bring them to the proper settings. This provides a simple and accurate means for maintaining the instrument in precise setting for accurate functioning.

I claim:
1. In an instrument of the character described, a rigid base member defining a datum plane, a first arm pivotally mounted on the base for angular adjustment about a first axis normal to said datum plane, first pivot means carried by said base mounting said first arm in a first plane parallel to and spaced from said datum plane, an extension formed integrally with said base and projecting outwardly from one side of said base, means defining a guideway on said extension, a carriage mounted on the base extension on said guideway for back and forth movement parallel to said datum plane, a second arm pivotally attached to the carriage for angular adjustment about a second axis normal to said datum plane, second pivot means carried by said carriage pivotally mounting said second arm in a second plane parallel to and spaced from said datum plane and said first plane, said second arm being adjustable longitudinally with respect to said second axis, said guideway directing said carriage on the base member so that the pivotal axis of the second arm describes a predetermined rectilinear path intersecting the pivotal axis of the first arm and permitting the pivotal axis of the second arm to coincide with the pivotal axis of the first arm, a rider on the first arm adjustable longitudinally of the latter, third pivot means on said rider providing a pivotal connection between the second arm and the rider affording freedom for relative angular movements of the first and second arms about a third axis normal to the said datum plane, said third axis being adjustable with the rider longitudinally of the first arm in a path intersecting the pivotal axis of the first arm and permitting the pivotal axis of the rider to coincide with the pivotal axis of the first arm, the arms, the carriage and the rider being adjustable into relative positions wherein the three pivotal axes coincide with a common line normal to said datum plane, indicating means on said first, second and third pivot means operable to indicate the position of coincidence of said three pivotal axes, linear scale means for indicating the distances between the said axes in differing relative adjusted positions of the arms, and angular scale means carried by said base and said carriage for indicating at least two of the angles included in the triangle defined by said pivotal axes.

2. An instrument according to claim 1 wherein said angular scale means consist of a segmental scale on the base member concentric with the pivotal axis of the first arm and swept by the latter in its movement about said axis, and a segmental scale on the carriage concentric with the pivotal axis of the second arm on the carriage and swept by the latter in its movement about said axis.

3. An instrument according to claim 1 wherein the said first, second and third pivot means are provided with apertures positioned so as to register precisely when the said points are in the said coinciding relation.

References Cited in the file of this patent

UNITED STATES PATENTS

| | | |
|---|---|---|
| 997,826 | Jones | July 11, 1911 |
| 1,117,805 | De l'Eau | Nov. 17, 1914 |
| 1,149,085 | Renstrom | Aug. 3, 1915 |
| 1,486,400 | Turner | Mar. 11, 1924 |
| 1,661,096 | Rowe | Feb. 28, 1928 |
| 2,160,820 | Bensen | June 6, 1939 |
| 2,449,342 | Tardif | Sept. 14, 1948 |
| 2,505,149 | Schoenberg | Apr. 25, 1950 |

FOREIGN PATENTS

| | | |
|---|---|---|
| 18,341 | Great Britain | 1914 |
| 301,323 | Germany | Sept. 24, 1919 |
| 1,051,574 | France | Sept. 16, 1953 |